Aug. 21, 1934.   H. W. IRWIN   1,971,264
SAFETY BELT
Filed Aug. 22, 1933
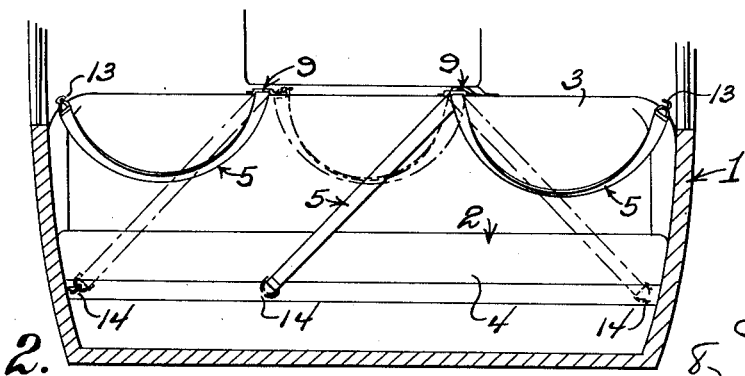
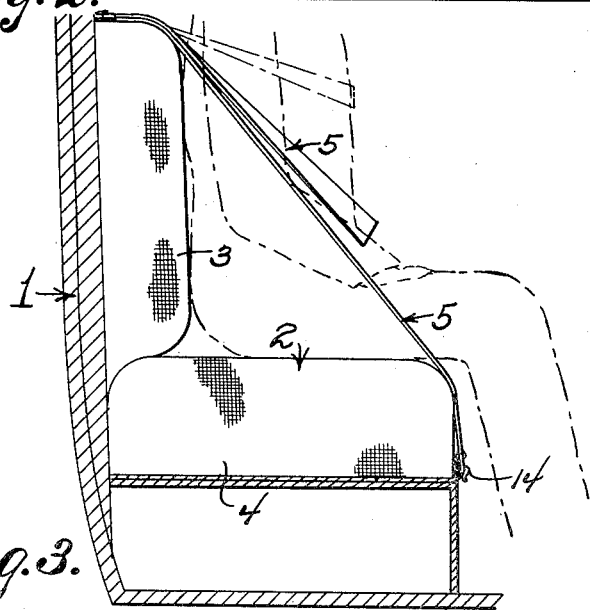
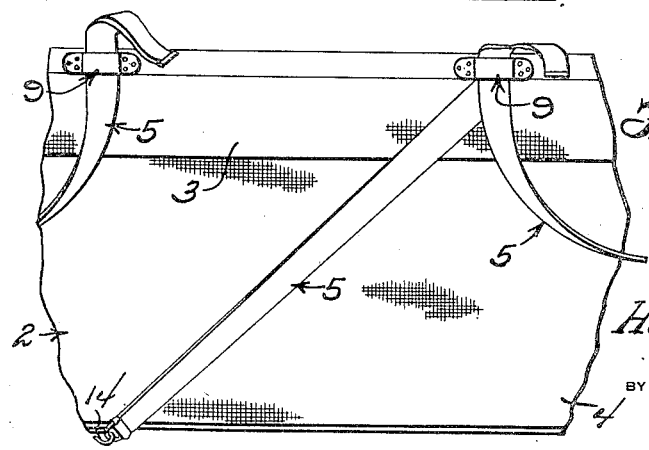
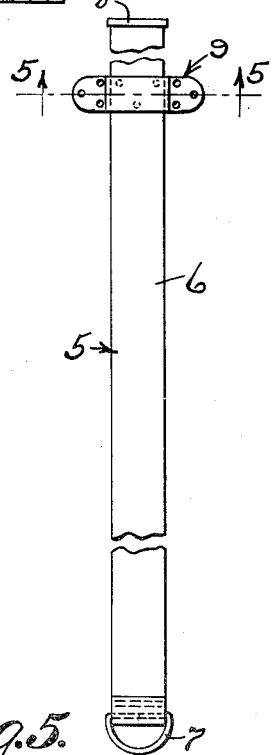
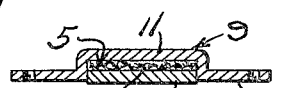
Harry W. Irwin
INVENTOR
BY Victor J. Evans & Co.
ATTORNEY Patented Aug. 21, 1934

1,971,264

UNITED STATES PATENT OFFICE 1,971,264

SAFETY BELT

Harry W. Irwin, Lancaster, Pa.

Application August 22, 1933, Serial No. 686,303

1 Claim. (Cl. 155—189)

This invention relates to safety belts for automobiles and has for the primary object the provision of a device of the above stated character which is especially adapted to prevent the occupant or occupants of the automobile from being thrown from the seat during a sudden stopping of the automobile or during an accident where an automobile is turned over or in collision with another automobile or an object, consequently obviating possibility of the occupants being thrown from a seated position against some part of the automobile and receiving injury thereby.

With these and other objects in view this invention consists in certain novel features of construction, combination and arrangement of parts to be hereinafter more fully described and claimed.

For a complete understanding of my invention, reference is to be had to the following description and accompanying drawing, in which Figure 1 is a fragmentary transverse sectional view illustrating an automobile seat with my invention applied thereto.

Figure 2 is a fragmentary vertical sectional view illustrating the same.

Figure 3 is a fragmentary view showing the connection of the belts to the seat.

Figure 4 is a plan view illustrating one of the belts.

Figure 5 is a sectional view taken on the line 5—5 of Figure 4.

Referring in detail to the drawing, the numeral 1 indicates a fragmentary portion of the body of an automobile with the seat thereof indicated by the character 2. The seat includes the usual back 3 and seat cushion 4. The seat 2 in this instance is shown as capable of accommodating three people and has applied thereto a belt 5 for each person. Each belt consists of a strap 6, one end of which is provided with a looped element 7 while the opposite end is finished with a beading 8. A bracket 9 is employed for adjustably connecting the strap 6 to the seat 2 of the automobile. The bracket 9 is preferably secured to the back portion 3 of the seat, as shown in Figure 1, and consists of a plate 10 offset, as shown at 11, to receive therein the strap 6 and an inner plate 12. The ends of the plate 10 are apertured to receive screws or like fasteners for securing said plate to the back portion of the seat 2. The inner plate 12 is also provided with apertures to receive fasteners for securing the same to the back 3. The strap 6 is arranged between the plates 10 and 12 and with said plates secured in position to the seat of the automobile sufficient frictional contact will be had between the belt and the respective plates to retain the belt in adjusted positions. To adjust the belt it is only necessary to release the plate 10.

Suitable hooks 13 and 14 are provided for the belts. The hooks 13 are secured to the upper edge of the back portion 3 while the hooks 14 are secured to the frame for supporting the seat cushion 4. The arrangement of the hooks 13 and 14 permit the belts to be either arranged to extend about the occupants' bodies under the arms or diagonally across the bodies, as shown in Figure 1. The belts when applied to the occupants will prevent them from being thrown from a seated position in case of sudden stopping of the automobile or the collision thereof with some object.

While I have shown and described the preferred embodiment of my invention, it will be understood that minor changes in construction, combination and arrangement of parts may be made without departing from the spirit and scope of my invention, as claimed.

Having described the invention, I claim:

A safety belt comprising a strap, a beading at one end of the strap to form a stop, a clamp mounted to the upper edge of the back of a motor vehicle seat and embodying a pair of plates receiving therebetween the strap and one plate having means interfitting with the other plate, fasteners carried by said plates for releasably securing the plates to the back of the seat and permitting the latter to be adjusted relative to each other for gripping and releasing the strap for sliding movement, a loop element carried by the other end of said strap and upper and lower fasteners secured to the seat and arranged laterally of the clamp to be engaged by the loop element for arranging the strap either about the front of an occupant of the seat or diagonally across the occupant.

HARRY W. IRWIN.